United States Patent [19]
Mycroft

[11] 3,785,325
[45] Jan. 15, 1974

[54] AMPHIBIOUS STRUCTURE

[76] Inventor: Leonora M. Mycroft, 1973 Campus Dr., Fairborn, Ohio 45323

[22] Filed: June 14, 1971

[21] Appl. No.: 152,501

[52] U.S. Cl..................... 115/1 R, 297/93, 180/77 S
[51] Int. Cl............................................. B60f 3/00
[58] Field of Search ..................... 297/93; 180/77 S; 115/1; 287/14

[56] References Cited
UNITED STATES PATENTS

| | | | |
|---|---|---|---|
| 3,154,044 | 10/1964 | Bellas................................. | 115/1 R |
| 3,446,176 | 5/1969 | Grange et al...................... | 115/1 B |
| 1,672,212 | 6/1928 | Hale.................................. | 180/77 S |
| 1,411,978 | 4/1922 | Page................................. | 297/93 |
| 649,362 | 5/1900 | Ryan et al......................... | 287/14 |

Primary Examiner—George E. A. Halvosa
Assistant Examiner—Edward R. Kazenske
Attorney—L. Gaylor Hulbert et al.

[57] ABSTRACT

An amphibious vehicle having means for driving the vehicle on land at one end thereof and having means for driving the vehicle in the water at the other end thereof including a seat in the vehicle adapted to be pivoted about an axis transverse of the vehicle to provide a driving seat for the vehicle when it is driven from one end and a rear seat for the vehicle when it is driven from the other end.

1 Claim, 4 Drawing Figures

PATENTED JAN 15 1974　　　　　　　　　　　　3,785,325
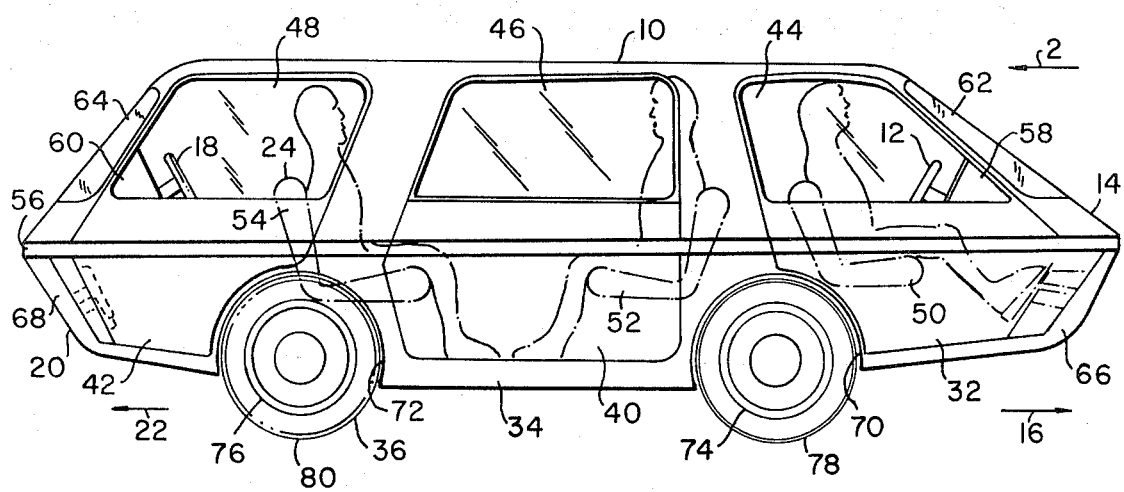
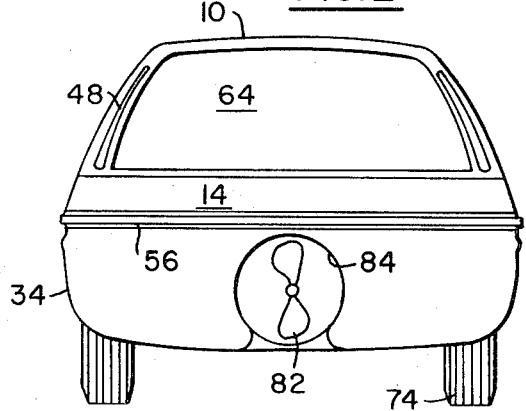
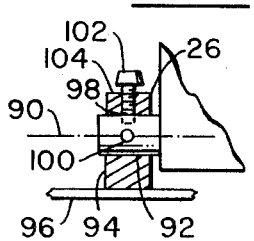
INVENTOR.
LEONORA M. MYCROFT
BY Whittemore
Hulbert & Belknap
ATTORNEYS

AMPHIBIOUS STRUCTURE

CROSS REFERENCE TO RELATED APPLICATIONS

This application is related to the Mycroft U.S. Pat. Nos. 3,280,785 and 3,362,373. The disclosures of these patents are intended to be incorporated herein by reference along with the disclosures of the Trippel U.S. Pat. No. 3,114,347 and Sessions U.S. Pat. No. 3,131,666, which also disclose amphibious vehicles.

BACKGROUND OF THE INVENTION

1. Field of the Invention

The invention relates to amphibious vehicles and refers more specifically to an amphibious vehicle including means for driving the vehicle on land at one end thereof and means for driving the vehicle in water at the other end thereof and a tilting or reversible seat at one end thereof.

2. Description of the Prior Art

Amphibious vehicles of the past including those disclosed in the above referenced patents have been driven both on the land and in the water from the same end of the vehicle. With such structure, the driving controls and mechanisms have usually been combined, and even combined are cramped in installation and therefore are not the best structure for either driving on land or driving in the water.

In addition, in the amphibious vehicles of the past, seat structures have usually been stationary, making separate seats for separate functions necessary.

SUMMARY OF THE INVENTION

The invention is an amphibious vehicle which includes structure for driving the vehicle on the land at one end thereof and structure for driving the vehicle in the water at the other end thereof. Thus, both driving structures may be best suited and most efficient for the particular use it is designed for and is not crowded or made less efficient due to compromises required if a single drive mechanism is to be effective for both driving the vehicle on land and in the water.

The invention further includes a seat at at least one end of the vehicle which is mounted on pivot means at the bottom thereof for pivoting about a transverse axis through the vehicle. The pivoted seat may be used as a rear seat when the vehicle is being driven from one end thereof and may be used as a driving seat when the vehicle is being driven from the other end thereof. In accordance with the invention, the seat may be locked in either of its two pivoted positions.

BRIEF DESCRIPTION OF THE DRAWINGS

FIG. 1 is an elevation view of an amphibious vehicle constructed in accordance with the invention.

FIG. 2 is an end view of the amphibious vehicle illustrated in FIG. 1 taken in the direction of arrow 2 in FIG. 1.

FIG. 3 is an enlarged partial section view of the vehicle illustrated in FIG. 1 illustrating one of the pivoted seats therein in the two alternate positions thereof, FIG. 4 is an enlarged partial section view of the pivot portion of the seat structure illustrated in FIG. 3 taken substantially on the line 4—4 in FIG. 3.

DESCRIPTION OF THE PREFERRED EMBODIMENT

The amphibious vehicle 10 illustrated in the drawings includes means 12 at end 14 thereof for driving the vehicle in the direction of arrow 16 on land. Means 18 are provided at end 20 of the vehicle 10 for driving the vehicle in the water in the direction of arrow 22.

The vehicle 10 further includes the tilting seat structure 24. The seat 24 may be tilted into either position illustrated in FIG. 3 and locked in either position by the locking structure 26 illustrated in FIG. 4.

The vehicle 10, as illustrated particularly in FIG. 1, includes the body or hull generally indicated 34 which is positioned on the chassis generally indicated 36. The body 34, as shown, is a metal shell including the doors 38, 40 and 42 therein, which may be on both sides of the vehicle and which have windows 44, 46 and 48 respectively therein. The doors 38, 40 and 42 permit entry into the land driver seat 50, the passenger seat 52 and the water driver seat 54 respectively, and when closed are watertight at least up to the trim molding 56, which may be the water line of the vehicle with the vehicle in use in the water. Vent windows 58 and 60 are provided as desired.

The vehicle body 34 further includes the windshield 62 for driving the vehicle on land and the windshield 64 for driving the vehicle in the water. Bumpers 66 and 68 are provided at the opposite ends of the vehicle 14 and 20, as shown. The wheel wells 70 and 72 are also provided in the body 34 outside of the dry passenger compartment of the vehicle in which the wheels 74 and 76 of the chassis having the tires 78 and 80 thereon are positioned.

The driving structure 12 for the vehicle 10 includes a steering wheel, the usual engine and a drive train for driving the vehicle 10 on the land, as well as the other usual driving controls therefor, which driving controls are positioned at the end 14 of the vehicle. The engine may be mounted over the wheel 74, or if desired, may be mounted in a compartment beside the driver in the seat 50 or beneath the seat 50. The steering wheel, engine, drive train and controls for driving the vehicle on land and connections thereto and therebetween are intended to be completely standard and are not therefore considered in detail herein.

Similarly, the means for driving the vehicle 10 from the other end 68 are intended to be completely standard and includes a boat steering wheel, which again may be positioned as desired at the end 68 of the vehicle. The same engine may be used to drive the boat in the water and on land or if it is desired, a separate marine engine at end 68 of the vehicle or even located centrally of the vehicle in a low compartment or under one or more of the vehicle seats may be provided.

The propeller 82 for the vehicle as shown is positioned in a recess 84 in the body 34 of the vehicle 10 at the end 14 of the vehicle and is designed to function in the manner of the normal boat propeller connected to the same engine used to drive the vehicle on land, just as the vehicle engine is connected in driving relation to one or both sets of wheels 74 and 76 in a conventional manner.

Steering the vehicle in the water may be accomplished by connecting the front or steerable vehicle wheels at end 14 to the boat steering wheel or water jets directed against movable vanes or rudders may be used where the wheels of the vehicle are retracted and/or faired.

With such arrangement, it will be understood that the automobile is intended to be driven in the usual forward direction on the ground from the end 14 and in the water from the end 20. Obviously, the vehicle can be backed up either as a land vehicle or as a boat, utilizing the usual controls for such movement of the amphibious vehicle. The controls are however maintained separate and therefore are completely adapted for their separate use.

The seat structure 24 as shown in more detail in FIG. 3 includes a portion 86 and a portion 88 connected together to form a generally L-shaped cross section longitudinally of the vehicle. The seat structure 24, as shown, is rigid and is movable between the position shown in full lines in FIG. 3 and the alternate position thereof shown in phantom in FIG. 3 on pivoting of the seat structure about a pivot axis 90 which extends transversely of the vehicle. In the position illustrated in full lines in FIG. 3, the seat 24 provides a seat for a driver driving the vehicle when used as a boat in the water. In the position illustrated in phantom in FIG. 3, the seat 24 provides a rear seat for the vehicle 10 in use on land.

The seat 24 is pivotally mounted at each end on a separate pivot axle 92 rotatably positioned in the bearing 94 secured to the floor 96 or frame of the vehicle 10. The pivot axle 92 is provided with a pair of radially extending recesses 98 and 100 therein spaced apart approximately 90° which are adapted to receive the end of pin 102 extending through passage 104 in the bearing 94 with the seat 24 in either of the two positions shown in FIG. 3 to lock the seat in either of these positions. When it is desired to change position of the seat, it is merely necessary to raise the pin 102, pivot the seat and re-insert the pin in one of the holes 98 and 100 to lock the seat in the new position thereof.

Wheel retraction and fairing structure as disclosed in the above referenced U.S. Pat. Nos. 3,280,785 and 3,362,373 may be used in conjunction with the vehicle 10 as desired.

Similarly, appropriate seals to maintain the body of the amphibious vehicle dry are contemplated by the inventor and within the skill of the art indicated in the above referenced patents. In particular, the doors of the vehicle 10 may be constructed to open only above the water line of the vehicle 10 so that sealing of the doors will not be critical, as desired.

While one embodiment of the present amphibious vehicle structure of the invention has been considered in detail, it will be understood that other embodiments and modifications are contemplated. It is therefore intended to include all embodiments and modifications of the invention as are suggested by the appended claims within the scope of the invention.

What I claim as my invention is:

1. An amphibious vehicle constructed and arranged to operate on land and on water having a body with top and bottom portions, first means mounted in said bottom portion at one end of the vehicle for only operating the vehicle on land, second means mounted in said bottom portion at the other end of the vehicle for only operating the vehicle in water, and a plurality of seats in the vehicle for passengers or operators at least one of which is totally pivotable 90 degrees about an axis transverse of the vehicle between at least two operable positions therefor, in one of which the seat is oriented to direct a passenger sitting in the seat toward one end of the vehicle and in the other of which the seat is oriented to direct a passenger sitting in the seat toward the other end of the vehicle, which one seat includes an L-shaped cross section taken longitudinally of the vehicle, one portion of which extends horizontally and the other portion of which extends vertically of the vehicle, both portions of which are substantially identical, pivot mounting structure for the one seat including pivot axles at both sides of the one seat for pivoting of the seat 90° to reverse the portion of the L-shaped cross section extending vertically and horizontally, and means for locking the seat in either of the pivoted positions thereof including a bearing for the pivot axles at each side of the seat, at least two radially extending recesses in at least one pivot axle disposed approximately 90° to each other, an opening extending through the bearing for the one pivot axle, and a locking pin adapted to extend through the opening in the bearing and into one of the two recesses in the one pivot axis aligned with the opening through the bearing in the two pivoted positions of the seat.

* * * * *